United States Patent
Fowler et al.

(10) Patent No.: US 12,330,457 B2
(45) Date of Patent: Jun. 17, 2025

(54) GANGWAY WITH CRIMPING ELEMENT ATTACHMENT FOR A MULTI-CAR VEHICLE

(71) Applicant: Dellner Couplers AB, Falun (SE)

(72) Inventors: Jason Fowler, Allestree (GB); Daniel Alton, Staffordshire (GB)

(73) Assignee: Dellner Couplers AB, Falun (SE)

( * ) Notice: Subject to any disclaimer, the term of this patent is extended or adjusted under 35 U.S.C. 154(b) by 206 days.

(21) Appl. No.: 17/962,911

(22) Filed: Oct. 10, 2022

(65) Prior Publication Data

US 2023/0106246 A1 Apr. 6, 2023

Related U.S. Application Data

(63) Continuation of application No. 15/930,814, filed on May 13, 2020, now Pat. No. 11,479,070.

(30) Foreign Application Priority Data

May 14, 2019 (EP) .................................. 19 174 417

(51) Int. Cl.
*B60D 5/00* (2006.01)
*B61D 17/22* (2006.01)
(Continued)

(52) U.S. Cl.
CPC .............. *B60D 5/003* (2013.01); *B61D 17/22* (2013.01); *B64F 1/305* (2013.01); *B64F 1/3055* (2013.01); *B64F 1/31* (2013.01)

(58) Field of Classification Search
CPC ........ B60D 5/003; B61D 17/22; B61D 23/00; B64F 1/305; B64F 1/3055; B64F 1/31; B60R 3/00
See application file for complete search history.

(56) References Cited

U.S. PATENT DOCUMENTS

| 5,546,866 A | 8/1996 | Koch | |
|---|---|---|---|
| 2010/0025960 A1* | 2/2010 | Tabellini | B61D 17/22 280/403 |

(Continued)

FOREIGN PATENT DOCUMENTS

| CN | 2563045 Y | 7/2003 |
|---|---|---|
| CN | 201544968 U | 8/2010 |

(Continued)

OTHER PUBLICATIONS

US Cargo Control, 3" Webbing, Dec. 13, 2018 (Year: 2018).*
Google Search with date of US Cargo Control Posting (Year: 2018).*

*Primary Examiner* — Anne Marie M Boehler
*Assistant Examiner* — Abigail R Hymel
(74) *Attorney, Agent, or Firm* — Howard IP Law Group, PC

(57) ABSTRACT

A gangway for a multi-car vehicle has a bellows attached to an endframe and a crimping element attached to the endframe. The crimping element has a crimping mouth. A part of the bellows is inserted into and held inside the crimping mouth. The crimping mouth is defined by two sidewalls arranged next to each other and joined together at one of their ends by a bottom wall, and not joined together at opposite ends to provide an opening of the crimping mouth. The crimping mouth causes the part of the bellows that is held inside the crimping mouth to be pinched together, and is of a material having spring properties such that one of the side walls can be moved away from the other one of the side walls only by tensioning the side walls against a restoring force provided by the spring properties of the crimping element.

17 Claims, 10 Drawing Sheets

(51) Int. Cl.
*B64F 1/305* (2006.01)
*B64F 1/31* (2006.01)

(56) References Cited

U.S. PATENT DOCUMENTS

| | | |
|---|---|---|
| 2010/0025961 A1 | 2/2010 | Tabellini et al. |
| 2016/0288804 A1 | 10/2016 | Goebels et al. |

FOREIGN PATENT DOCUMENTS

| | | | | |
|---|---|---|---|---|
| CN | 102180177 | A | 9/2011 | |
| CN | 102180178 | A | 9/2011 | |
| DE | 1400854 | A1 | 1/1969 | |
| DE | 9413320 | U1 | 11/1994 | |
| DE | 10044127 | A1 * | 3/2002 | ............ B60D 5/003 |
| DE | 202009008164 | U1 | 9/2009 | |
| EP | 1602546 | A1 | 12/2005 | |
| EP | 1702829 | A2 | 9/2006 | |
| EP | 2149463 | A1 | 2/2010 | |
| EP | 2335995 | A1 * | 6/2011 | ............ B60D 5/003 |
| EP | 2418107 | A1 | 2/2012 | |
| EP | 2335995 | B1 | 10/2012 | |
| KR | 20090115285 | A | 11/2009 | |
| KR | 1020100042300 | | * 4/2010 | ............ B61D 17/22 |

\* cited by examiner

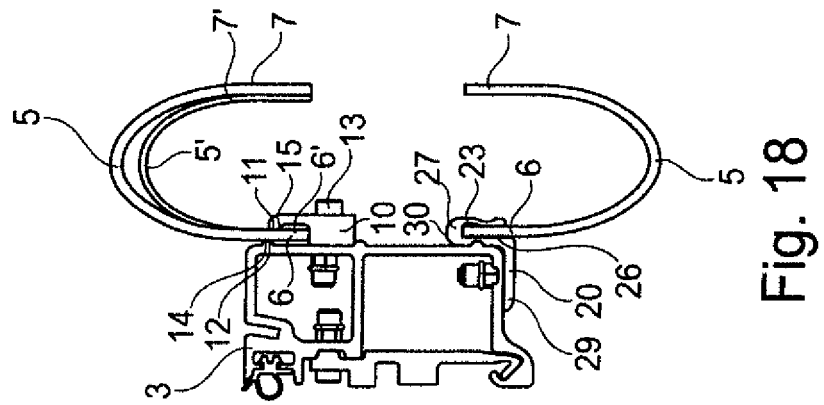
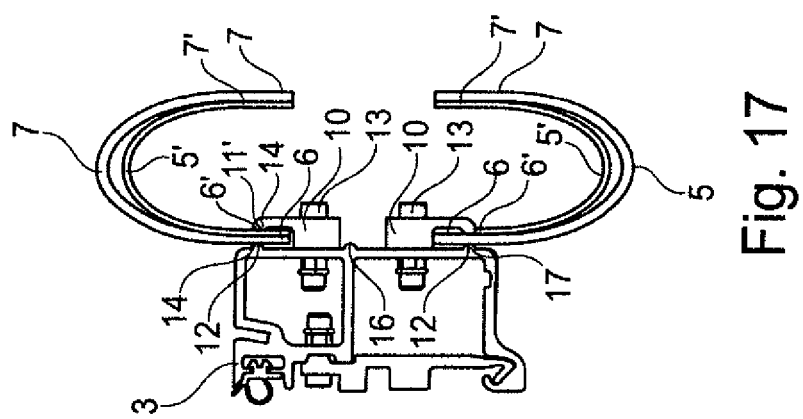
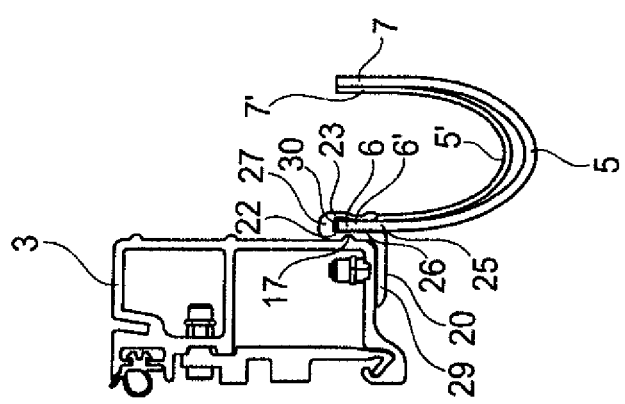

GANGWAY WITH CRIMPING ELEMENT ATTACHMENT FOR A MULTI-CAR VEHICLE

CROSS REFERENCE TO RELATED APPLICATION

This patent application is a continuation of co-pending U.S. patent application Ser. No. 15/930,814, filed on May 13, 2020, which application claims the benefit and priority of European Patent Application No. 19 174 417.6 filed on May 14, 2019, the disclosures of which are incorporated by reference herein in their entireties as part of the present application.

FIELD OF INVENTION

The invention relates to a gangway for a multi-car vehicle. The invention also relates to a method for attaching a bellows of a gangway to an endframe of a gangway.

BACKGROUND

Gangways are known from everyday life. They provide a means for passengers to move from one enclosure, for example a room of a building or a car of a multi-car vehicle, to a second enclosure, for example a room of a different building or a vehicle or a second car of a multi-car vehicle, by means of such a gangway that is connected to the one enclosure on the one end and the second enclosure at the second end. In multi-car vehicles, like trains or articulated buses, gangways are arranged between a first car and a second car of these types of multi-car vehicles. Gangways are, for example, also used at airports, where they connect the airport building with the plane.

Designs are also known, where two gangways are connected to one another. Certain train types have a first car that at one of its ends has a first gangway connected to it. The first end of the first gangway is connected to the first car. These types of trains have a second car with a second gangway attached to it. The first end of the second gangway is attached to the second car. In these types of trains, the second end of the first gangway and the second end of the second gangway are connected to each other, thereby connecting the first gangway to the second gangway in order to provide means for the passengers to safely cross from the first car to the second car.

Regardless of the remaining elements that are used to make up the gangway, e.g. bellows or panels that slide relative to each other in a telescopic fashion, many gangway designs use an endframe as means to connect the gangway to the neighbouring object, which might be a further gangway or a car or a room or a different type of enclosure. Especially with those gangways that are used in technical areas, where the gangway in certain periods of use is detached from its neighbouring object, the use of endframes provides a clear interface to the neighbouring object and provides predefined means for connecting the gangway to the neighbouring object.

While gangways are known that have sidewalls that can move relative to each other in a telescopic manner, one frequent type of gangway is a gangway that comprises a bellows and an endframe. The invention relates to this subtype of a gangway. The endframe of such a gangway is used to attach the gangway to the neighbouring object, for example the car. The bellows is used to create a tunnel, through which the passengers can pass. The bellows typically is made up of a series of convolutes, whereby the respective convolute has a horseshoe-shape. The gangway might have an outer bellows. An outer bellows is understood to be a bellows, whereby the individual convolutes of the bellows open towards the inside of the gangway while the rounded bottoms of the individual convolutes are arranged further outward. The gangway might have an inner bellows. An inner bellows is understood to be a bellows, whereby the individual convolutes of the bellows open towards the outside of the gangway while the rounded bottoms of the individual convolutes are arranged further inward. The gangway might even have outer bellows and inner bellows.

SUMMARY

The problem to be solved by the invention is to provide a gangway with a simple way of attaching the bellows to the endframe.

The basic concept of the invention is to provide simple attachment elements that can be used to attach the bellows to the endframe, namely to provide the gangway with a crimping element that is attached to the endframe and/or to provide the gangway with a holding element that is attached to the endframe.

According to the invention, the crimping element has a crimping mouth, whereby a part of the bellows is inserted into the crimping mouth and is held inside the crimping mouth.

According to the invention, the holding element has a holding surface that faces a countersurface on the endframe, whereby a part of the bellows is arranged between the holding surface and the countersurface and is pressed against the countersurface by the holding element.

The advantages of the invention can already be obtained, if one of the two elements, namely either a crimping element or a holding element is provided attached to the endframe. In a preferred embodiment, a crimping element and a holding element can be attached to the endframe. Alternatively, in a preferred embodiment, several crimping elements can be attached to the endframe. In yet another embodiment, several holding elements can be attached to the endframe. In yet another preferred embodiment, several crimping elements and several holding elements can be attached to the endframe.

The crimping element is attached to the endframe. In a preferred embodiment, the crimping element is attached to the endframe by a screw. In a preferred embodiment, the endframe has a threaded hole and the screw that attaches the crimping element to the endframe is screwed into the threaded hole. In an alternative embodiment, the endframe has an unthreaded through-hole, whereby a screw passes through the through-hole and engages with a nut that is arranged on the other side of the through-hole in relation to the crimping element. The nut rests against the wall that surrounds the through-hole and thereby holds the screw in place, which screw can be used to attach the crimping element to the endframe. Other means of attaching the crimping element to the endframe are feasible. The crimping element can be glued or welded to the endframe. The crimping element can also be riveted or nailed to the endframe. It is also feasible to weave bands through a hole in the crimping element and a hole in the endframe and thereby attach the crimping element to the endframe.

The crimping element has a crimping mouth, whereby a part of the bellows is inserted into the crimping mouth and held inside the crimping mouth. In a preferred embodiment, the crimping mouth is designed to cause the part of the bellows that is held inside the crimping mouth to be pinched or pressed together. In a preferred embodiment, the crimping mouth has a U-shape or a C-shape in cross-section. The crimping mouth most preferably is defined by two sidewalls that are arranged next to each other, whereby the sidewalls are joined together at one side by a bottom wall and whereby the other side is left open to provide an opening, through which the part of the bellows that is to be held inside the crimping mouth can be introduced into the space between the two sidewalls. The part that is to be held inside the crimping mouth can be introduced into the crimping mouth until the part contacts the bottom wall.

Designs are feasible, where the surfaces of the sidewalls that face each other and hence delimit the crimping mouth are arranged in parallel to each other. In a preferred embodiment, however, one surface is arranged at a slight angle of less than 60°, preferably of less than 50°, preferably of less than 40°, relative to the surface of the other sidewall and preferably is arranged in such a way, that the distance between the two sidewalls in the area of the opening is smaller than the distance between the two sidewalls in the area of the bottom wall. The gap between the two sidewalls hence is smaller in the area of the opening than in the area next to the bottom wall. Such an arrangement can lead to a pinching effect. Such a design is preferably obtained, if the crimping element is made from a material with spring properties, whereby the crimping element is manufactured in such a way, that one side element can be moved away from the other side element only by means of tensioning the element against a restoring force that is provided by the spring qualities of the element.

The crimping of the part of the bellows that is to be held inside the crimping mouth can be further enhanced, if at least one of the sidewalls, preferably both sidewalls have pinching structures, like for example teeth that can dig into the surface of the part of the bellows that is to be held inside the crimping mouth. In a preferred embodiment, the teeth are arranged in rows of teeth. In a preferred embodiment, the rows of teeth are arranged on the sidewalls in an area of the sidewalls that is close to the opening between the two sidewalls. In a preferred embodiment, no teeth are arranged in an area of the sidewalls that is close to the bottom wall.

In a preferred embodiment, the crimping element is made of metal, preferably of aluminium. The crimping element can also be made of plastic.

In a preferred embodiment, the thickness of the sidewalls and the bottom wall is constant. In an alternative embodiment, the thickness of the sidewalls and/or the thickness of the bottom wall can vary. In a preferred embodiment, the thickness of the first sidewall remains constant. In a preferred embodiment, the thickness of the bottom wall remains constant, whereby the bottom wall preferably is thicker than the thickness of the first sidewall. In a preferred embodiment, the thickness of the second sidewall is constant and is smaller than the thickness of the first sidewall and the thickness of the bottom wall. In a preferred embodiment, one sidewall can have a bulge at its free end, which is considered to be the end next to the opening and not the end next to the bottom wall.

In a preferred embodiment, the endframe has a surface and has a bead arranged on the surface, whereby the crimping element has a recess that cooperates with the bead. The bead can be a bead of a shape of half of a ball. The bead can, however, also be a longitudinal ledge that is arranged on the surface of the endframe, whereby the recess of the crimping element has the shape of a groove that cooperates with this ledge. In a preferred embodiment, the bead is arranged on a beam of the endframe and extends along at least 50%, more preferably at least 60%, more preferably at least 70%, more preferably at least 80%, more preferably at least 90% of the longitudinal extent of the beam.

In a preferred embodiment, the crimping element is an angled part. One end of the angled part is an attachment part for the crimping element, the attachment part being the part that is attached to the endframe. The other end of the angled part is a crimping part that has the crimping mouth.

In a preferred embodiment, the endframe has a beam that extends along a longitudinal axis. In a preferred embodiment, the crimping element is attached to this beam.

In a preferred embodiment, the endframe has a ring shape that encircles a passage space. The passage space is the space through which passengers can enter or leave the gangway through the endframe. In a preferred embodiment, the crimping mouth of the crimping element opens towards the passage space. In an alternative embodiment, the opening of the crimping mouth opens away from the passage space.

The holding element is attached to the endframe. In a preferred embodiment, the holding element is attached to the endframe by a screw. In a preferred embodiment, the endframe has a threaded hole and the screw that attaches the holding element to the endframe is screwed into the threaded hole. In an alternative embodiment, the endframe has an unthreaded through-hole, whereby a screw passes through the through-hole and engages with a nut that is arranged on the other side of the through-hole in relation to the holding element. The nut rests against the wall that surrounds the through-hole and thereby holds the screw in place, which screw can be used to attach the holding element to the endframe. Other means of attaching the holding element to the endframe are feasible. The holding element can be glued or welded to the endframe. The holding element can also be riveted or nailed to the endframe. It is also feasible to weave bands through a hole in the holding element and a hole in the endframe and thereby attach the holding element to the endframe.

The holding element has a holding surface that faces a counter surface of the endframe. In a preferred embodiment, the holding element has a basic body and a projection projecting from the basic body, whereby the holding surface is arranged on the projection. The basic body can, for example, be the part of the holding element, through which an element passes that attaches the holding element to the endframe.

For example a screw can pass through a hole in the basic body. The basic body can have a ground surface that rests against the endframe. The basic body can be of block-shaped from in a cross section.

In a preferred embodiment, the projection is of a ledge-shape. The projection can be a wall that protrudes away from the basic body. In a preferred embodiment, the projection protrudes parallel to a surface of the endframe or protrudes in plane that is orientated in a range of +30° to −30° to a plane that is parallel to a surface of the endframe.

In a preferred embodiment, the free wall of the projection that faces the surface of the endframe is considered to be the holding surface. Embodiments are feasible where only a part of the holding surface is in actual contact with the actual part of the bellows that is held in the actual embodiment. How much contact between the holding surface and the part of the bellows arranged between the holding surface and the counter surface is given, depends on the thickness of this part of the bellows, the geometric shape of this part of the bellows (e.g. if the part has constant thickness or has a diminishing or increasing thickness towards the end) and depends on the design of the projection and the geometric shape of the projection. In a preferred embodiment, the thickness of the projection is constant. In an alternative embodiment, the thickness of the projection can vary. In a preferred embodiment, one projection can have a bulge at its free end. Embodiments are feasible, where only this bulge, i.e. only a part of the holding surface is in actual contact with the bellows. Depending on the thickness of the bellows and the distance between the holding surface and the counter surface, the bulge can indent into the bellows.

Designs are feasible, where the counter-surface and the holding surface that face each other are arranged in parallel to each other. In a preferred embodiment, however, one surface is arranged at a slight angle of less than 60°, preferably of less than 50°, preferably of less than 40°, relative to the other surface and preferably is arranged in such a way, that the distance between the two sidewalls in the area of the opening is smaller than the distance between the two surface in the area closer to the basic body of the holding element. The gap between the two surfaces hence is smaller in the area of the opening than in the area next to the basic body. Such an arrangement can lead to a pinching effect. Such a design is preferably obtained, if the projection from the holding element is made from a material with spring properties, whereby projection from the holding element is manufactured in such a way, that the projection can be moved away from the endframe only by means of tensioning the projection against a restoring force that is provided by the spring qualities of the material of the projection.

In a preferred embodiment, the holding element is made of metal, preferably of aluminium or steel. The holding element can also be made of plastic.

In a preferred embodiment, the counter surface is a plane part of the surface of the endframe.

In a preferred embodiment, the endframe has a surface and has a bead arranged on the surface, whereby the holding element has a recess that cooperates with the bead. The bead can be a bead of a shape of half of a ball. The bead can, however, also be a longitudinal ledge that is arranged on the surface of the endframe, whereby the recess of the holding element has the shape of a groove that cooperates with this ledge. In a preferred embodiment, the bead is arranged on a beam of the endframe and extends along at least 50%, more preferably at least 60%, more preferably at least 70%, more preferably at least 80%, more preferably at least 90% of the longitudinal extent of the beam.

In a preferred embodiment, the endframe has a beam that extends along a longitudinal axis. In a preferred embodiment, the holding element is attached to this beam. In a preferred embodiment, the crimping element or the holding element is a longitudinal element, which has a longitudinal extent that is at least three times, more preferably at least five times, more preferably at least ten times longer than the width and the height of this element. In a preferred embodiment, the crimping element is a lath or a rod or a longitudinal plate that is attached to the endframe. In a preferred embodiment, the crimping mouth opens towards a long side of the longitudinal element; hence crimping mouth also has a longitudinal extend. In a preferred embodiment, the crimping element is a lath or a rod or a longitudinal plate that is attached to the endframe.

In a preferred embodiment, the crimping element or the holding element is attached to a beam of the endframe. In a preferred embodiment, the crimping element or the holding element attached to the beam of the endframe extends along at least 50%, more preferably at least 60%, more preferably at least 70%, more preferably at least 80%, more preferably at least 90% of the longitudinal extent of the beam, to which the crimping element or the holding element is attached.

In a preferred embodiment, the endframe has a beam, whereby the beam has at least two beads, more preferably three beads, arranged on one of its surfaces. In a preferred embodiment, the individual beads are ledges, whereby at least two beads are provided as ledges that are arranged in parallel to one another. In a preferred embodiment, the respective bead extends along at least 50%, more preferably at least 60%, more preferably at least 70%, more preferably at least 80%, more preferably at least 90% of the longitudinal extent of the beam.

In a preferred embodiment, the endframe has a profiled beam, whereby the crimping element and/or the holding element is attached to the profiled beam.

In a preferred embodiment, the endframe has a ring shape and surrounds a passage space, whereby the endframe has an inward facing surface that faces towards the passage space and has a side surface that is arranged at an angle to the inward facing surface. In a preferred embodiment, the crimping element or the holding element is attached to the side surface or is at least attached to the endframe in such a manner that the crimping mouth of the crimping element is arranged next to the side surface.

In a preferred embodiment the endframe can be of u-shape or c-shape or can have the shape of a ring that surrounds a passage space. The passage space is the window in the frame, through which the passengers can enter into the gangway. The term "ring" is not limited to circular rings or elliptically shaped rings. The term "ring" simply identifies that the frame closes around the passage space. The ring can, for example, also have a rectangular shape. The ring can also have a trapezoidal shape or any polygonal shape. In some designs, the ring can have a top beam and a bottom beam that are straight and have two side beams that connect the respective ends of the top beam and the bottom beam, whereby the side beams can have a curvature. The shape of the endframe beam often is chosen either in dependency of the overall shape of the object, to which it is attached. Hence the endframe often is designed in dependency of the cross-sectional shape of a car of a multi-car train, to which it might be connected. The shape of the endframe can also be chosen in relation to the interface that the neighbouring object, to which the endframe is to be connected, offers.

The endframe of the gangway according to the invention is suitable to be connected to an endframe of a different gangway or to a car of a multi-car vehicle or to a building, if the gangway is used at an airport for example.

The endframe comprises a beam. The endframe can be made up of several beams that are connected to each other. For example, if the endframe is chosen to be u-shaped, the endframe can have a straight top beam with a first end and a second end, whereby a side frame is connected to the first end and a further side frame is connected to the second end of the top beam, the two side beams extending at an angle, preferably at an angle of about or exactly 90° to the top beam. In an embodiment, wherein the endframe is designed to be a ring, the endframe can have a top beam, two side beams and a bottom beam. Additional beams can be provided, for example between one end of a top beam and one end of a side beam, for example by way of a diagonal beam that connects one end of a top beam with the top end of a side beam. A u- or c-shaped endframe or even a ring-shaped endframe can be made up of one singular beam. Using extrusion methods or moulding methods, it is possible to provide such end beams that are made of one singular beam that is moulded or extruded into the desired u-, c- or even ring-shape (whereby when producing a ring-shape it might become necessary to interconnect two free ends of an extruded profile for example by welding or gluing in order to complete the ring).

In a preferred embodiment, the beam is a longitudinal beam. In a preferred embodiment, the extent of the beam in a first direction of a three-dimensional system of coordinates, especially preferred a cartesian system of coordinates, is substantially larger than the extent of the beam in the second direction and is substantially larger than the extent of the beam in the third direction. In a preferred embodiment, the cross-section of the beam in a section perpendicular to the direction of its longest extent is generally rectangular or generally quadratic, but could also be generally circular or generally of elliptical shape.

In a preferred embodiment, the cross-sectional shape of the beam in the cross-sections perpendicular to its direction of longest extent stay the same for the majority of the extent of the beam. Most preferably, 60%, most preferably 70%, most preferably 80%, most preferably 90% of the extent of the beam in the direction of its longest extent has the same cross-section. The cross-section might vary towards the respective end of the beam to facilitate the connection of the respective beam to a neighbouring beam. In an especially preferred embodiment, the beam has the same cross-sectional shape along its full extent in its direction of longest extent. This might, for example, be the case, if the beam is an extruded beam.

In a preferred embodiment, where the endframe has several beams that are connected to each other, for example screwed together at flanges or welded together or glued together, the individual beams at least for the majority of their extent into their respective direction of longest extent have the same cross-sectional shape.

In a preferred embodiment, where the endframe is made up of several beams, the majority of the beams, more preferably all beams have the same cross-sectional design or for those embodiments, where the individual beams only have a constant cross-sectional design for a certain percentage of their individual longitudinal extend, that shape of the cross section, that for a certain percentage of the individual longitudinal extend of the individual beam is constant, is the same shape for the majority of beams, preferably all beams that only have a constant cross-sectional design for a certain percentage of their individual longitudinal extend.

In a preferred embodiment of the embodiment, where the endframe is made up of several beams, the majority of beams, more preferably all beams are cut off sections from a profiled beam that was cut into sections to provide the majority, preferably all individual beams that make up the endframe.

In a preferred embodiment, the beam has a reinforcing core structure. This reinforcing core structure can be provided by a part of the beam being generally of a pipe-shape, the pipe extending in the direction of longest extent of the beam. The part that makes up the reinforcing core structure of the beam in cross-sections perpendicular to the direction of longest extent of the beam has a closed cross-section in the sense of a ring-shaped cross-section. The shape of the ring must not necessarily be circular or elliptical, but can be a quadratic or a rectangular ring or a polygonal ring.

In a preferred embodiment, the endframe has a reinforcing core structure. In the embodiment, where the endframe is made up of several beams, this reinforcing core structure can be provided by the reinforcing core structures of the individual beams.

Wherever in this description a c-shape or a u-shape are being mentioned, the c-shape is used to highlight that the cross-sectional area can be generally curved, while u-shape is used to indicate that at least the sides of the cross-sectional shape can be straight lines, whereby a u-shape would also include cross-sectional designs with two straight sides that are connected to the respective ends of a straight bottom, the angle between the sides in the bottom most preferably being 90°.

The gangway might have support structures, like for example support beams that support frames or hoops of the bellows or that might support tread plates of the gangway. Such support structures might be connected to the endframe.

The invention is also directed to a multi-car vehicle that has a gangway according to the invention. The multi-car vehicle might have one (single) gangway. In such a design, the gangway would be connected to one car of the multi-car vehicle at one end and would be connected to a second car of the multi-car vehicle at its other end. Most preferably, such a gangway has an endframe according to the invention at each of its ends, hence allowing the advantages of the endframe according to the invention to be realized at each connection to the respective car. A multi-car vehicle might also have a large gangway, which is made up of at least two gangways according to the invention as described above.

In a preferred embodiment, the multi-car vehicle according to the invention has a car, whereby the car has a frame, whereby the endframe of the gangway according to the invention is attached to the frame of the car.

In a preferred embodiment, the frame of the car is of the same design as the endframe of the gangway.

In a preferred embodiment, the gangway has a first bellows attached to the endframe and has a further bellows attached to the endframe.

In a preferred embodiment, the holding element has a second holding surface that faces a second countersurface on the endframe, whereby a part of the further bellows is arranged between the second holding surface and the second countersurface and is pressed against the second countersurface by the holding element. In the embodiment where the holding element has a basic body and the first holding surface is arranged on a projection projecting from the basic body, the second holding surface most preferably is arranged on a second projection that projects from basic body. In a preferred embodiment, the second projection projects into the opposite direction from the basic body that the projection with the first holding surface projects into from the basic body. In a preferred embodiment, the second projection is of a ledge-shape. The second projection can be a wall that protrudes away from the basic body. In a preferred embodiment, the second projection protrudes parallel to a surface of the endframe or protrudes in plane that is orientated in a range of +30° to −30° to a plane that is parallel to a surface of the endframe. In a preferred embodiment, the free wall of the second projection that faces the surface of the endframe is considered to be the second holding surface. Embodiments are feasible where only a part of the second holding surface is in actual contact with the actual part of the bellows that is held in the actual embodiment. How much contact between the second holding surface and the part of the bellows arranged between the second holding surface and the counter surface is given, depends on the thickness of this part of the bellows, the geometric shape of this part of the bellows (e.g. if the part has constant thickness or has a diminishing or increasing thickness towards the end) and depends on the design of the second projection and the geometric shape of the second projection. In a preferred embodiment, the thickness of the second projection is constant. In an alternative embodiment, the thickness of the second projection can vary. In a preferred embodiment, the second projection can have a bulge at its free end. Embodiments are feasible, where only this bulge, i.e. only a part of the second holding surface is in actual contact with the bellows. Depending on the thickness of the bellows and the distance between the second holding surface and the second counter surface, the bulge can indent into the bellows.

In a preferred embodiment, the second counter surface is a plane part of the surface of the endframe.

In a preferred embodiment, the gangway has a first attachment position and a second attachment position, whereby the crimping element can be attached to the endframe in the first attachment position or in the second attachment position, the first attachment position differing from the second attachment position either in the orientation of the holding element or by way of being spaced apart from the second attachment position.

In a preferred embodiment, the gangway is characterized by a first attachment position and a second attachment position, whereby the holding element can be attached to the endframe in the first attachment position or in the second attachment position, the first attachment position differing from the second attachment position either in the orientation of the crimping element or by way of being spaced apart from the second attachment position.

The bellows is used to create a tunnel, through which the passengers can pass. The bellows in a preferred embodiment is made up of a series of convolutes, whereby the respective convolute has a horseshoe-, u- or v-shape. The gangway might have an outwardly facing bellows. An outwardly facing bellows is understood to be a bellows, whereby the individual convolutes of the bellows open towards the inside of the gangway while the bottoms of the individual convolutes are arranged further outward.

The gangway might have an inwardly facing bellows. An inwardly facing bellows is understood to be a bellows, whereby the individual convolutes of the bellows open towards the outside of the gangway while the bottoms of the individual convolutes are arranged further inward. The gangway might even have outwardly facing bellows and an inwardly facing bellows.

In a preferred embodiment, where the bellows of the gangway has convolutes, preferably the last rim of the convolutes is the part of the bellows that is held inside the crimping mouth or pressed against the counter surface by the holding element respectively.

The method of attaching a bellows of a gangway according to the invention to an endframe of a gangway according to the invention comprises the steps of:
  attaching the crimping element to the endframe and
    inserting a part of the bellows into the crimping mouth of the attached crimping element or
    inserting a part of the bellows into the crimping mouth of the crimping element and attaching the crimping element to the endframe with the part of the bellows being arranged in the crimping mouth of the crimping element.

The method of attaching a bellows of a gangway according to the invention to an endframe of a gangway according to the invention comprises the steps of:
  in loosely attaching the holding element to the endframe, arranging a part of the bellows between the holding surface and the counter surface and tightening the attachment of the holding element to the endframe such that the part of the bellows arranged between the holding surface and the counter surface is pressed against the counter surface by the holding element or
  holding a part of the bellows against the counter surface and then attaching the holding element to the endframe such that the part of the bellows is arranged between the holding surface and the counter surface and is pressed against the counter surface by the holding element.

The multi-car vehicle according to the invention can be a train or can be a tram or can be an articulated bus. The gangway according to the invention can be used in such multi-car vehicles. The gangway according to the invention can, however, also be used to bridge the gap between a building and a vehicle, whereby the vehicle most preferably is a plane.

BRIEF DESCRIPTION OF THE DRAWINGS

Below, the invention will be described by reference to figures that only show exemplary embodiments of the invention. In the drawings:

FIG. 16 shows a section across a beam of an endframe of a gangway with an end part of a bellows attached to it according to a further embodiment of the invention.

FIG. 17 shows a section across a beam of an endframe of a gangway with an end part of a bellows attached to it according to a further embodiment of the invention; and FIG. 18 shows a section across a beam of an endframe of a gangway with an end part of a bellows attached to it according to a further embodiment of the invention.

DETAILED DESCRIPTION

Figure 1:
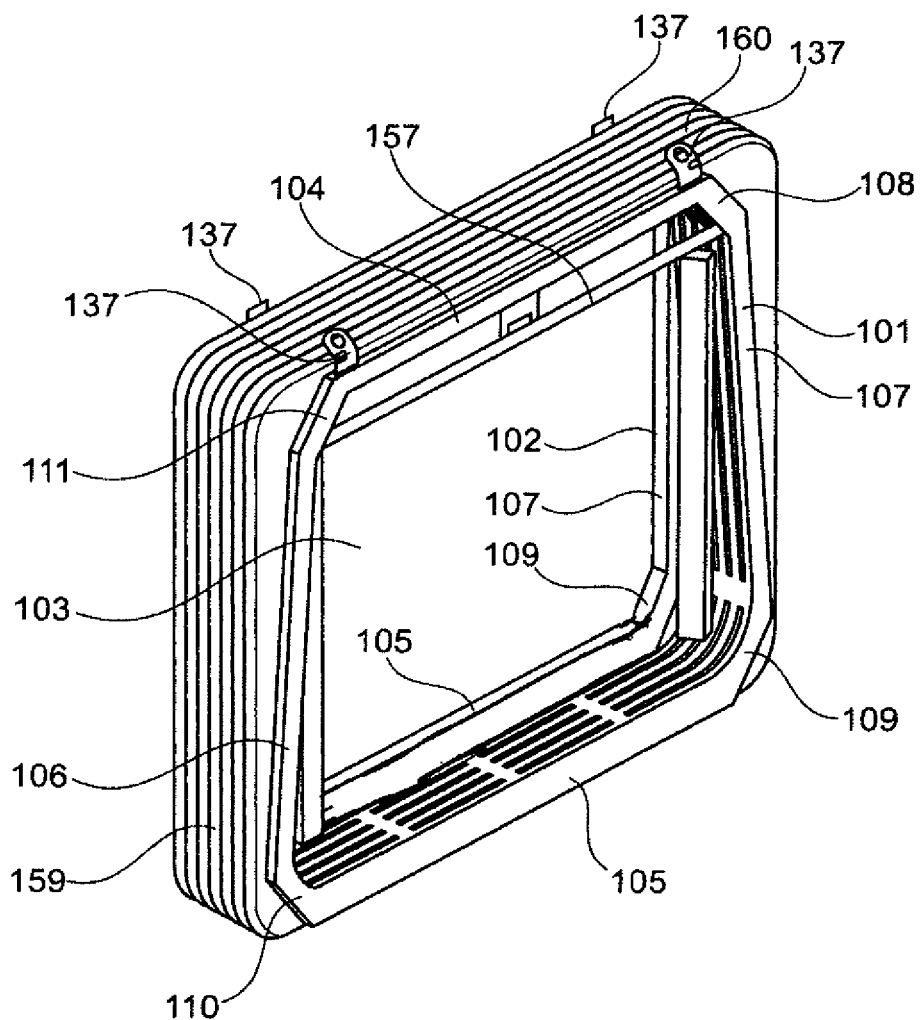
FIG. 1 shows a perspective view onto a part of a gangway with an endframe and a bellows that is attached to the endframe.

FIG. 1 shows a gangway 160 according to the invention. The gangway 160 has one endframe 101 at one of its ends and a further endframe 102 at its opposite end. The gangway 160 has an outwardly facing bellows 159. Either endframe 101, 102 can be used to connect the gangway 160 to a car of a multi-car vehicle (not shown) or to a further gangway (not shown). In FIG. 1 the beams 104, 105, 106, 107, 108, 109, 110, 111 of the endframe 102 have been identified with the reference signs 104, 105, 106, 107, 108, 109, 110, 111, which are also used to identify the beams of the endframe 101 in order to highlight the design-symmetry among the endframe 101 and endframe 102.

FIG. 1 shows that the gangway 160 can have interior elements in the passage space 103. Interior beams 157 can be arranged inside the passage space 103 and attached to their neighbouring endframe 101. The interior beams 157 can carry interior elements, like for example a part of the side panel (not shown). The gangway 160 an outwardly facing bellows 159, which is understood to be a bellows, whereby the individual convolutes of the bellows open towards the inside of the gangway 160 while the rounded bottoms of the individual convolutes are arranged further outward.

Endframe 101 and endframe 102 are of same design, but arranged in mirrored shape, the plane of symmetry being the vertical plane between the two endframes 101, 102. To facilitate the description, the description below will be focused on describing endframe 101. Endframe 101 and 102 being of same, but mirrored design, the description of endframe 101 of course also reads onto the design of endframe 102.

As can be seen from FIG. 1, endframe 101 has the shape of a ring that surrounds a passage space 103. The passage space 103 is the space, through which the passengers can pass.

The ring-shape of the endframe 101 is obtained by eight beams that make up the endframe 101 being connected to each other. The beams are a top beam 104 and a bottom beam 105. Furthermore, side beams 106, 107 are provided. Corner beams 108, 109, 110, 111 are arranged to connect the side beams 106, 107 to the top beam 104 or to connect the side beams 106, 107 to the bottom beam 105 respectively. As can be seen from FIG. 1, the endframe 101 has the shape of a polygonal ring. Top beam 104 and bottom beam 105 are arranged in parallel to each other. Side beam 106 and side beam 107 are arranged at a slight angle to each other. Looking at FIG. 1 it becomes readily apparent that the specific design of the endframe can easily be changed by changing the shape, design or presence of the beams. The endframe can be adapted to the specific surroundings, in which it will be used, especially the type of multi-car vehicle, it is used with. The endframe 101 could be adapted to be a u-shaped endframe, if for example the bottom beam 105 was removed or even if the bottom beam 105 and the corner beams 109, 110 would be removed.

As can be seen from FIG. 1, top beam 104, bottom beam 105, side beams 106, 107 and corner beams 108, 109, 110, 111 are longitudinal beams. The extent of the beams 104, 105, 106, 107, 108, 109, 110, 111 in a first direction of a three-dimensional cartesian system of coordinates is substantially larger than the extent of the beam in the second direction and is substantially larger than the extent of the beam in the third direction.

The gangway can have lifting hooks 137 arranged on the beam 104 for lifting the gangway. Below the beam 105 a section can be provided that gives the gangway enough clearness from the frame to the bellows so that the gangway can rest on the coupler. The beams 106 and 107 have handles of attaching mechanism that is used to lock and unlock the gangways together.

The beams 104, 105, 106, 107, 108, 109, 110, 111 are welded together, but could also be glued together or bonded together.

Figure 2:
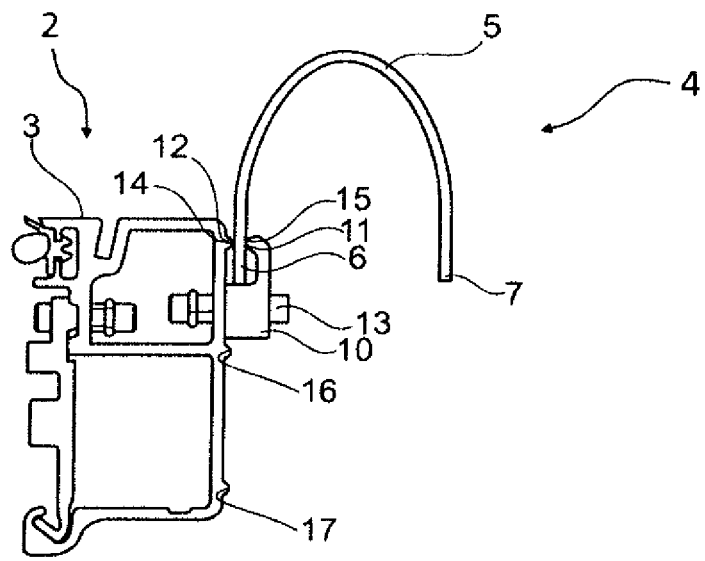
FIG. 2 shows a section across a beam of an endframe of a gangway with an end part of a bellows attached to it according to a first embodiment of the invention.
Figure 3:
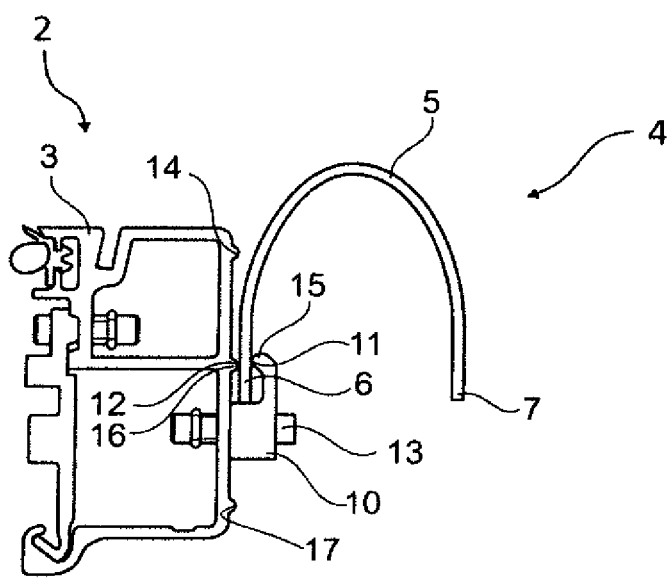
FIG. 3 shows a section across a beam of an endframe of a gangway with an end part of a bellows attached to it according to a further embodiment of the invention.
Figure 4:
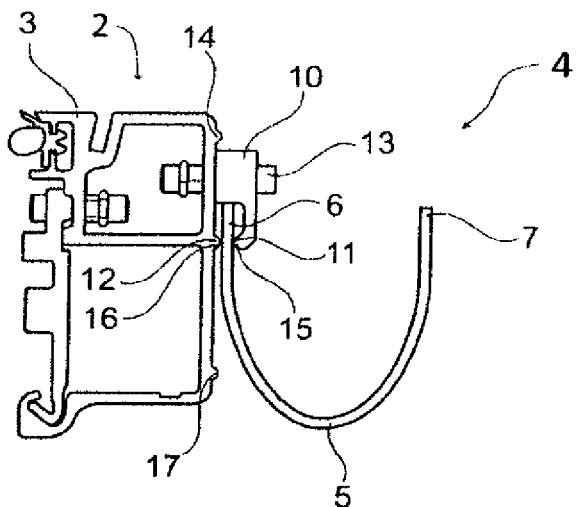
FIG. 4 shows a section across a beam of an endframe of a gangway with an end part of a bellows attached to it according to a further embodiment of the invention.
Figure 5:
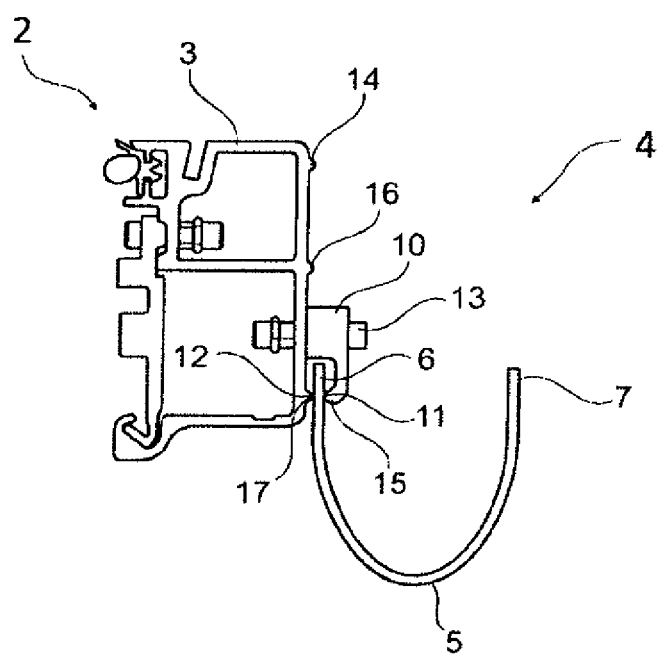
FIG. 5 shows a section across a beam of an endframe of a gangway with an end part of a bellows attached to it according to a further embodiment of the invention.

FIG. 2 shows the beam 3 of an endframe 2 of a gangway. FIG. 2 also shows the end convolute 5 of a bellows 4 of the gangway. The convolute 5 has end edge 6 and an inner edge 7. The inner edge 7 is attached to a neighbouring convolute (not shown in FIG. 2).

FIG. 2 shows a holding element 10 that is attached to the beam 3 of the endframe 2 by screw 13. The holding element 10 has a holding surface 11. The holding surface 11 faces a countersurface 12 on the beam 3 of the endframe 2. The end edge 6 of the bellows 4 is arranged between the holding surface 11 and the countersurface 12 and is pressed against the countersurface 12 by the holding element 10. The countersurface 12 has a bead 14 and the holding surface 11 has a bulge 15. One part of the end edge 6 of the convolute 5 of the bellows 4 is pressed by the bulge 15 against the bead 14.

As can be seen from FIG. 2, the beam 3 of the endframe 2 has several beads 14, 16, 17.

The FIGS. 2 to 5 show, that the three beads 14, 16, 17 can be used to provide different ways of attaching the end edge 6 of the convolute 5 of the bellows 4 to the beam 3 of the endframe 2 of the gangway 1.

Figure 6:
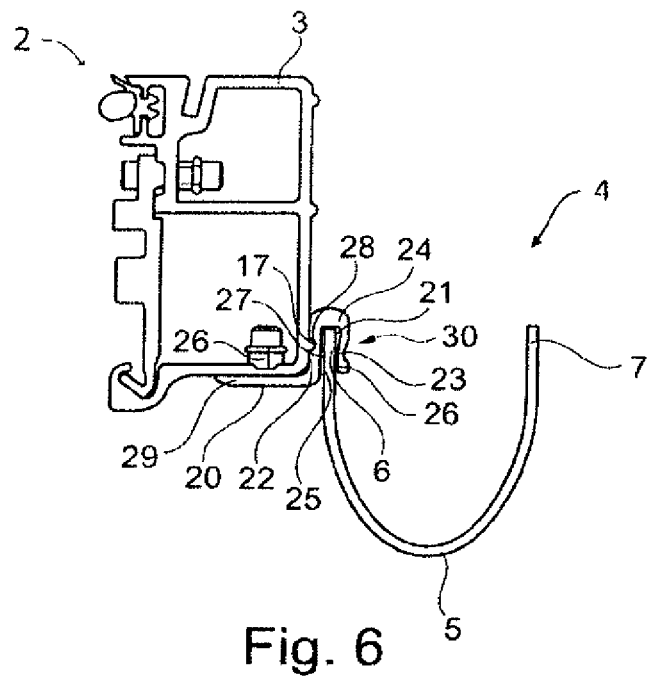
FIG. 6 shows a section across a beam of an endframe of a gangway with an end part of a bellows attached to it according to a further embodiment of the invention.
Figure 7:
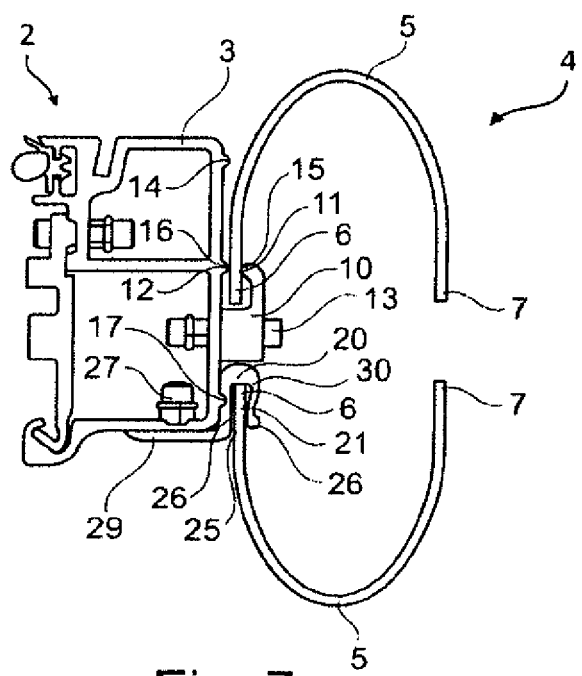
FIG. 7 shows a section across a beam of an endframe of a gangway with an end part of a bellows attached to it according to a further embodiment of the invention.
Figure 8:
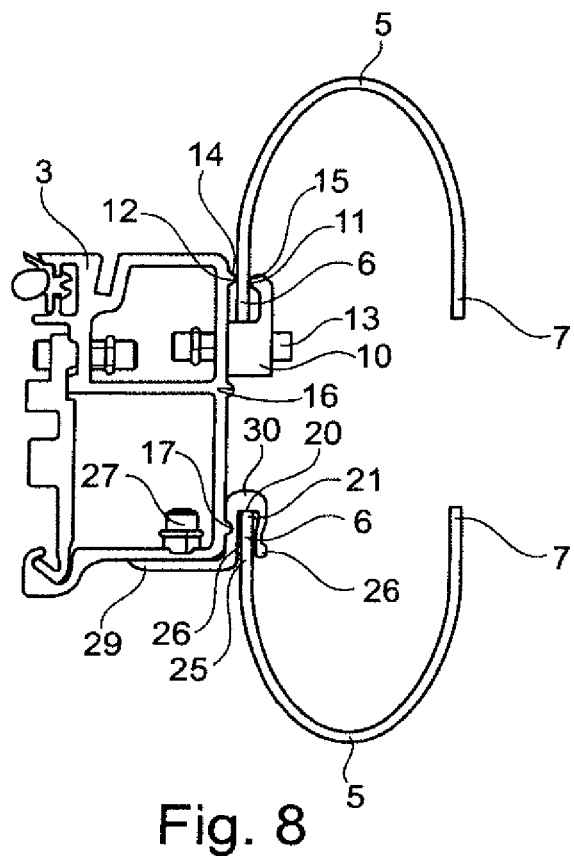
FIG. 8 shows a section across a beam of an endframe of a gangway with an end part of a bellows attached to it according to a further embodiment of the invention.
Figure 9:
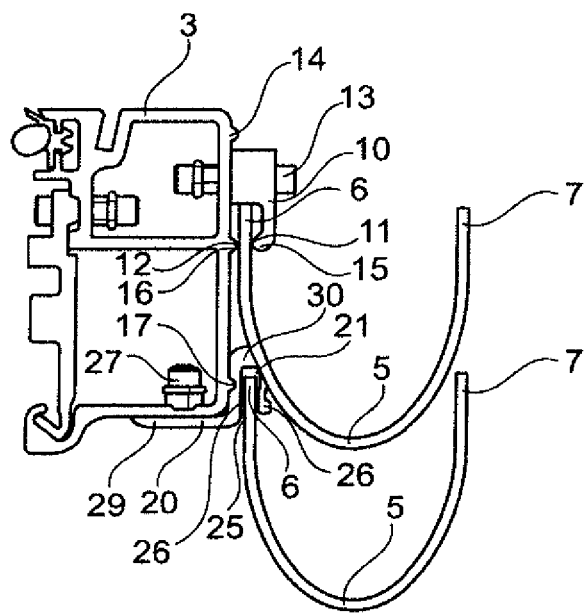
FIG. 9 shows a section across a beam of an endframe of a gangway with an end part of a bellows attached to it according to a further embodiment of the invention.
Figure 10:
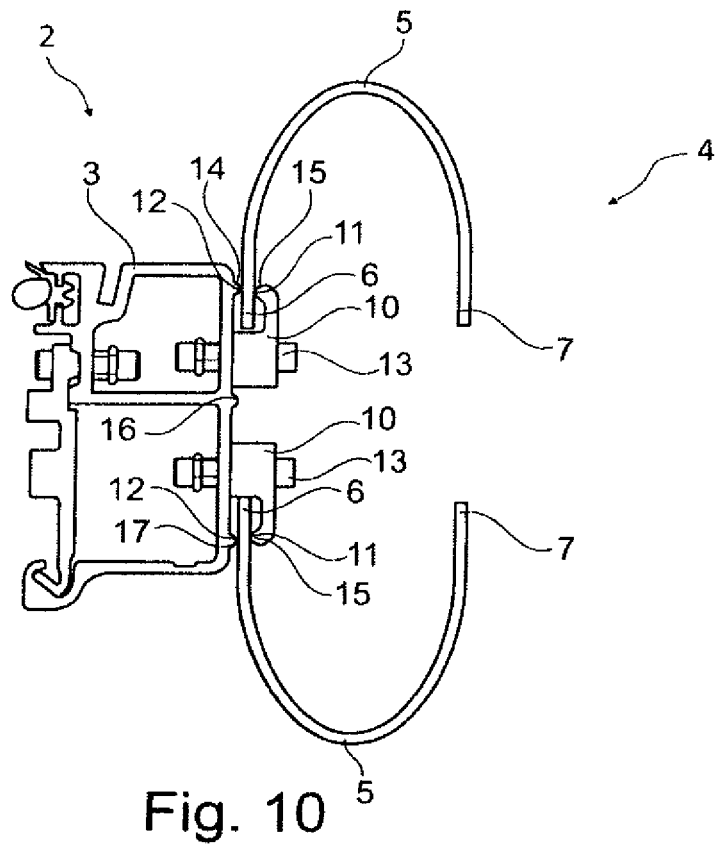
FIG. 10 shows a section across a beam of an endframe of a gangway with an end part of a bellows attached to it according to a further embodiment of the invention.

FIG. 6 shows a crimping element 20 that is attached to the beam 3 of the endframe 2 of the gangway 1. The crimping element has a crimping mouth 21. The end edge 6 of the convolute 5 of the bellows 4 is inserted into the crimping mouth 21 and is held inside the crimping mouth 21. The crimping mouth 21 is delimited by two sidewalls 22, 23. In a preferred embodiment, the crimping mouth has a U-shape or a C-shape in cross-section. The crimping mouth is defined by the two sidewalls 22,23 that are arranged next to each other, whereby the sidewalls 22,23 are joined together at one side by a bottom wall 24 and whereby the other side is left open to provide an opening 25, through which the part of the bellows 4 that is to be held inside the crimping mouth 21 can be introduced into the space between the two sidewalls 22,23. Both sidewalls 22,23 have pinching structures, namely teeth 26 that can dig into the surface of the part of the bellows 4 that is to be held inside the crimping mouth 21.

The crimping element 20 is attached to the beam 3 of the endframe 2 by way of a screw 27. The crimping element 20 has a recess 28 that cooperates with the bead 17. The crimping element 20 is an angled part. One end of the angled part is the attachment part 29 of the crimping element 20. The attachment part 29 being the part that is attached to the beam 3 of the endframe 2. The other end of the angled part is the crimping part 30 that has the crimping mouth 21.

Figure 11:
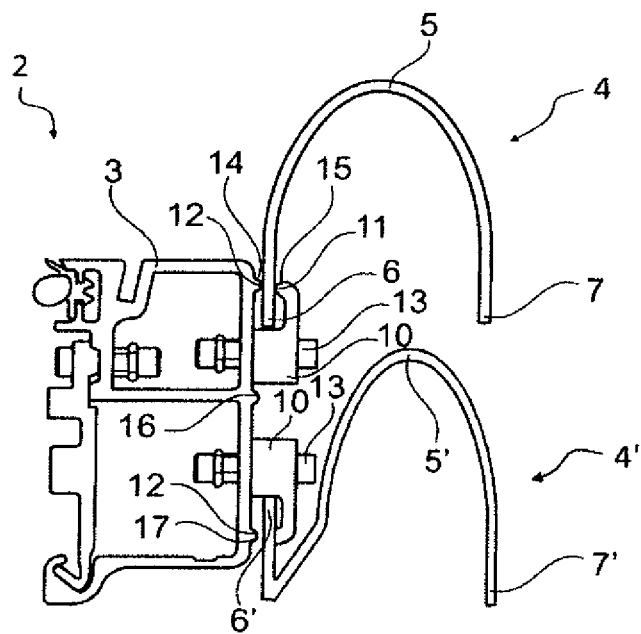
FIG. 11 shows a section across a beam of an endframe of a gangway with an end part of a bellows attached to it according to a further embodiment of the invention.
Figure 12:
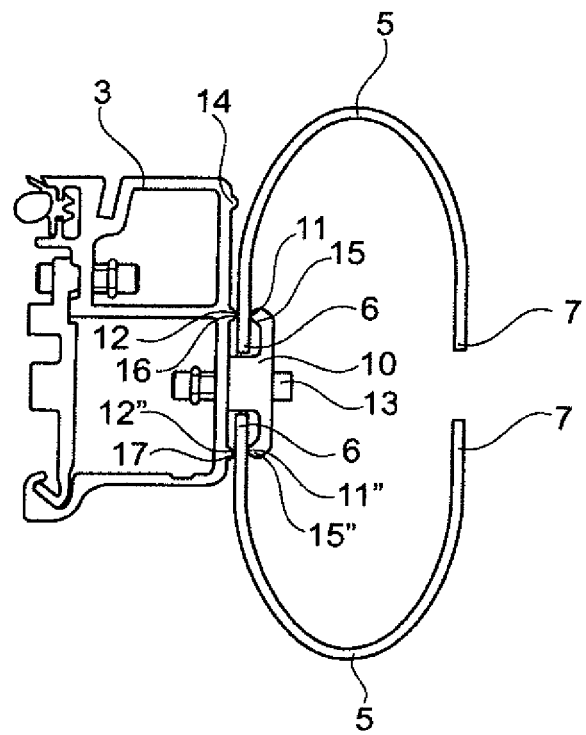
FIG. 12 shows a section across a beam of an endframe of a gangway with an end part of a bellows attached to it according to a further embodiment of the invention.
Figure 13:
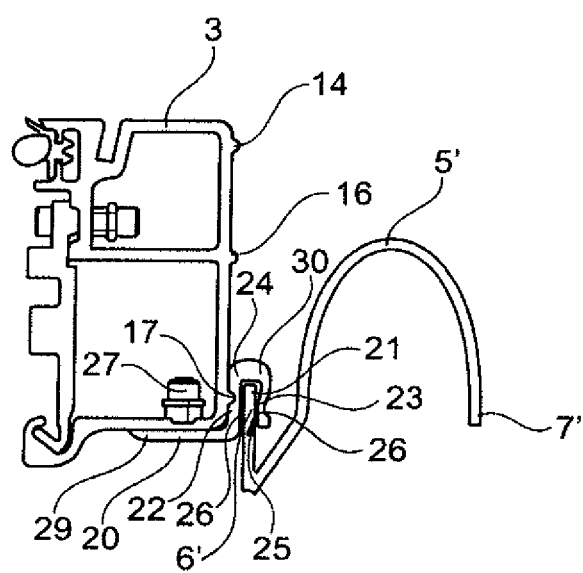
FIG. 13 shows a section across a beam of an endframe of a gangway with an end part of a bellows attached to it according to a further embodiment of the invention.
Figure 14:
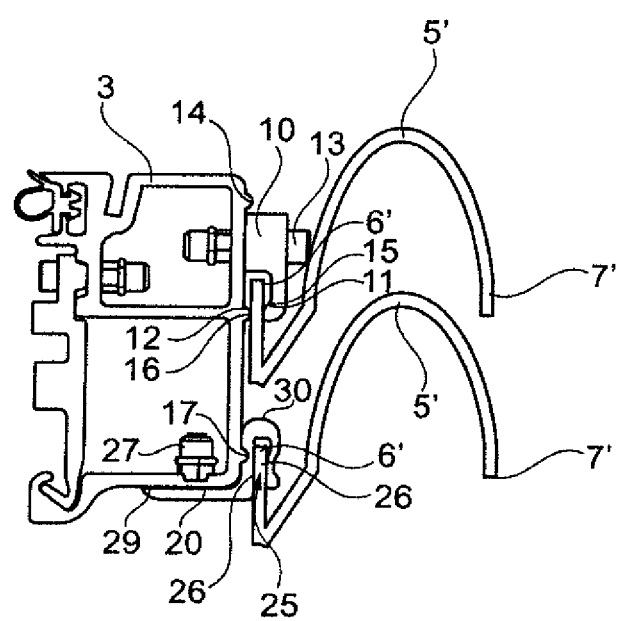
FIG. 14 shows a section across a beam of an endframe of a gangway with an end part of a bellows attached to it according to a further embodiment of the invention.

The FIGS. 7 to 14 show different embodiments of the gangway according to the invention with different combinations of crimping elements and holding elements and different attachment positions for these elements. In FIGS. 11, 13 and 14, a special type of bellows 4' is shown, which has an end convolute 5', which end convolute 5' has an end edge 6' that is bent backwards and an inner edge 7'.

FIG. 12 shows an embodiment, where the holding element 10 has a second holding surface 11" that faces a second countersurface 12" on the endframe, whereby a part of the further bellows 4 is arranged between the second holding surface 11" and the second countersurface 12" and is pressed against the second countersurface 12" by the holding element 10. The countersurface 12" has a bulge 15".

Figure 15:
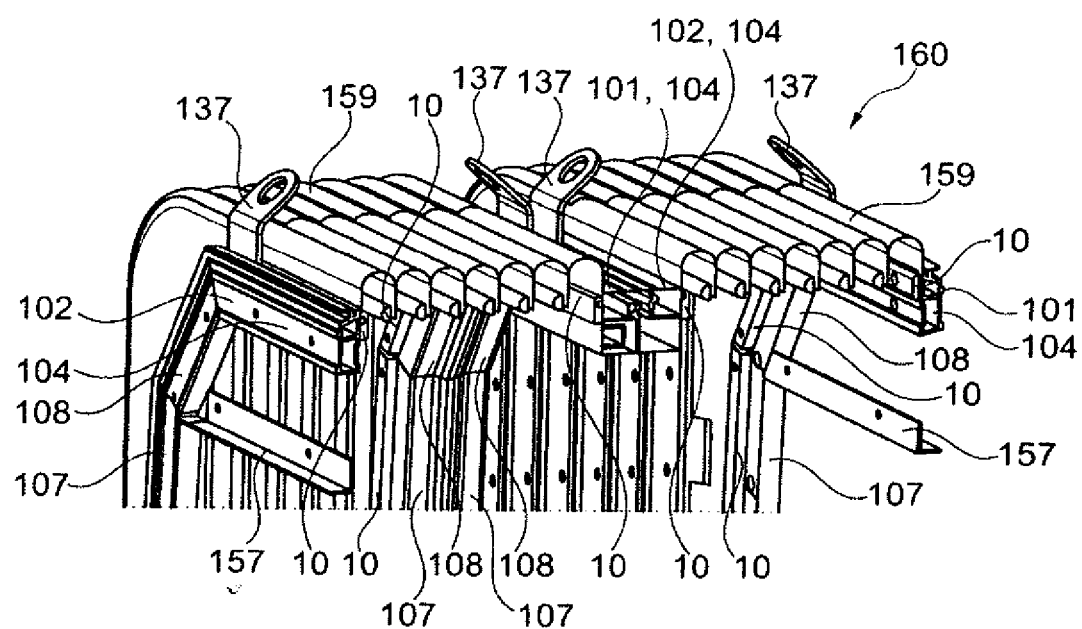
FIG. 15 shows a partially cut-away, perspective view onto a top part of a gangway according to the invention that is made up of two individual gangways joined together.

FIG. 15 shows a partially cut-away, perspective view onto a top part of a gangway according to the invention that is made up of two individual gangways 160 joined together at their endframes 101,102. FIG. 15 shows that the holding element 10 attached to beam 104 and the holding element 10 attached to beam 108 and the holding element 10 attached to beam 107 each are designed in the shape of a lath.

FIGS. 16 to 18 show that the bellows can be double corrugated bellows and that wherever a single corrugated bellows is shown in the FIGS. 2 to 14 above, also a double corrugated bellows can be used. To exemplify these alternatives, FIG. 16 shows an embodiment that is based on the embodiment shown in FIG. 6. The convolute 5 of the bellows has a second, inner layer 5'. FIG. 17 shows an embodiment that is based on the embodiment shown in FIG. 10. The two convolutes 5 shown have a second, inner layer 5' each. FIG. 18 shows an embodiment that is based on the embodiment shown in FIG. 8. The convolute 5 held by the holding element 10 has a second, inner layer 5', while the convolute 5 held by the crimping element 20 only has one convolute. FIG. 18 hence additionally exemplifies that within the embodiments that have two bellows, the arrangement can be varied, whereby in some embodiments only one of the two bellows is a double corrugated bellows, while in some embodiments both of the bellows are double corrugated bellows.

What is claimed is:

1. A gangway for a multi-car vehicle, the gangway comprising a bellows and an endframe, the bellows being attached to the endframe, wherein a crimping element is attached to the endframe, the crimping element having a crimping mouth, wherein a part of the bellows is inserted into the crimping mouth and held inside the crimping mouth, wherein the crimping mouth is defined by two sidewalls arranged next to each other and joined together at one of their ends by a bottom wall, wherein respective opposite ends of the two sidewalls are not joined together to provide an opening of the crimping mouth, and wherein the crimping mouth is designed to cause the part of the bellows that is held inside the crimping mouth to be pressed together between the two sidewalls of the crimping mouth by a pinching effect resulting from a force provided solely by spring properties of the crimping element, the crimping element formed of a material having spring properties such that one of the two side walls can be moved away from the other one of the two side walls only by tensioning the two side walls against a restoring force provided by the spring properties of the crimping element, wherein the crimping element is attached to an exterior side of the endframe by a screw having a head in an interior side of the endframe.

2. The gangway according to claim 1, wherein the endframe has a threaded hole and the screw is screwed into the threaded hole.

3. The gangway according to claim 1, wherein the endframe has an unthreaded through-hole and the screw passes through the through-hole from one side of the through-hole and engages with a nut arranged on another side of the through-hole.

4. The gangway according to claim 3, wherein the crimping element is arranged on the one side of the through-hole and the nut is arranged on the other side of the through-hole.

5. The gangway according to claim 1, wherein a cross-section of the crimping mouth has a C-shape.

6. The gangway according to claim 1, wherein surfaces of the two sidewalls that face each other and delimit the crimping mouth are arranged relative each other such that a distance between the two sidewalls in an area of the opening of the crimping mouth is smaller than a distance between the two sidewalls in an the area of the bottom wall of the crimping mouth, and a thickness of the two sidewalls and the bottom wall is constant.

7. The gangway according to claim 6, wherein the surface of one of the two side walls is arranged relative to the facing surface of the other one of the two sidewalls at an angle of less than 60°.

8. The gangway according to claim 1, wherein at least one of the two sidewalls has pinching structures in the form of teeth for engaging the surface of the part of the bellows being held inside the crimping mouth.

9. The gangway according to claim 1, wherein the crimping element is made of metal.

10. The gangway according to claim 9, wherein the crimping element is made of aluminum.

11. The gangway according to claim 1, wherein the crimping element is made of plastic.

12. The gangway according to claim 1, wherein the endframe has a surface and a bead arranged on the surface, and wherein the crimping element has a recess that cooperates with the bead.

13. The gangway according to claim 12, wherein the bead has a shape of half of a ball.

14. The gangway according to claim 12, wherein the bead forms a longitudinal ledge on the surface of the endframe, and wherein the recess of the crimping element has the shape of a groove cooperating with the ledge.

15. The gangway according to claim 12, wherein the bead is arranged on a beam of the endframe and extends along at least 50% of a length of the beam.

16. The gangway according to claim 1, wherein the crimping element is an angled part, wherein one end of the angled part being an attachment part by which the crimping element is attached to the endframe, and the other end of the angled part being a crimping part having the crimping mouth.

17. The gangway according to claim 1, wherein the endframe comprises a ring shape that encircles a passage through which passengers can enter or leave the gangway.

* * * * *